United States Patent
Akari et al.

(10) Patent No.: US 11,402,571 B2
(45) Date of Patent: Aug. 2, 2022

(54) WEAKLY-PENETRATING RADIATION DETECTION PLASTIC SCINTILLATING FIBER

(71) Applicant: KURARAY CO., LTD., Okayama (JP)

(72) Inventors: Masashi Akari, Niigata (JP); Katsuhiro Fujita, Niigata (JP)

(73) Assignee: KURARAY CO., LTD., Okayama (JP)

( * ) Notice: Subject to any disclaimer, the term of this patent is extended or adjusted under 35 U.S.C. 154(b) by 0 days.

(21) Appl. No.: 17/421,792

(22) PCT Filed: Jan. 8, 2020

(86) PCT No.: PCT/JP2020/000208
§ 371 (c)(1),
(2) Date: Jul. 9, 2021

(87) PCT Pub. No.: WO2020/145278
PCT Pub. Date: Jul. 16, 2020

(65) Prior Publication Data
US 2022/0091325 A1    Mar. 24, 2022

(30) Foreign Application Priority Data
Jan. 10, 2019    (JP) .............................. JP2019-002289

(51) Int. Cl.
*G01D 5/26* (2006.01)
*G02B 6/02* (2006.01)
*G01T 1/203* (2006.01)

(52) U.S. Cl.
CPC ......... *G02B 6/02033* (2013.01); *G01D 5/268* (2013.01); *G01T 1/203* (2013.01)

(58) Field of Classification Search
None
See application file for complete search history.

(56) References Cited

U.S. PATENT DOCUMENTS

2020/0191980 A1    6/2020    Shinji et al.

FOREIGN PATENT DOCUMENTS

| JP | S63-129304 A | 6/1988 |
| JP | H7-270637 A | 10/1995 |
| JP | 2000-137122 A | 5/2000 |
| WO | WO 2018/043383 A1 | 3/2018 |
| WO | WO 2018/110536 A1 | 6/2018 |

OTHER PUBLICATIONS

ISR for PCT/JP2020/000208, dated Mar. 31, 2020.
Written Opinion for PCT/JP2020/000208, dated Mar. 31, 2020.

*Primary Examiner* — Chad H Smith
(74) *Attorney, Agent, or Firm* — Greenblum & Bernstein, P.L.C.

(57) ABSTRACT

A plastic scintillating fiber capable of detecting radiation having a weakly penetrating property is provided. A plastic scintillating fiber according to an aspect of the present invention includes a plastic optical fiber, and further includes a core containing at least one type of a fluorescent agent, a cladding layer having a refractive index lower than that of the core disposed at a center, and an outermost layer covering an outer peripheral surface of the cladding layer. The outermost layer contains a base material that generates scintillation light, and at least one type of a fluorescent agent that converts the scintillation light into light having a wavelength longer than that of the scintillation light.

6 Claims, 2 Drawing Sheets

WEAKLY-PENETRATING RADIATION DETECTION PLASTIC SCINTILLATING FIBER

TECHNICAL FIELD

The present invention relates to a plastic scintillating fiber, and in particular to a plastic scintillating fiber suitable for detecting radiation having a weakly penetrating property.

BACKGROUND ART

The plastic scintillating fiber (PSF: Plastic Scintillating Fiber) is a plastic fiber in which the outer peripheral surface of a core, which serves as a scintillator, is coated with a cladding layer having a refractive index lower than that of the core, and is mainly used for the detection of radiation. The core is typically made of, for example, a polymeric material in which an organic fluorescent agent is added in a base material having an aromatic ring such as polystyrene or polyvinyl toluene. The cladding layer is composed of a polymeric material having a low refractive index such as polymethyl methacrylate or fluorine-containing polymethyl methacrylate.

The principle based on which radiation is detected by using a scintillating fiber will be explained. The base material of the core of the scintillating fiber has an aromatic ring. When applied radiation travels across the scintillating fiber, part of its energy is absorbed by the re-emission of secondary particles and the like inside the core and emitted as ultraviolet light. When no fluorescent agent is added in the core base material, the ultraviolet light is self-absorbed by the core base material itself, so that the ultraviolet light cannot propagate inside the core and disappears.

In the scintillating fiber, the aforementioned ultraviolet light is absorbed by the fluorescent agent added in the core base material, and light having a longer wavelength is re-emitted. Therefore, by selecting an appropriate fluorescent agent, it is possible to convert the ultraviolet light into light having a longer wavelength such as blue light, which is less likely to be self-absorbed by the core base material, and make the light having the longer wavelength propagate inside the scintillating fiber. The light that has propagated inside the fiber is detected by a detector which is connected to one end or both ends of the fiber.

As described above, the scintillating fiber has two functions, i.e., a function of detecting radiation and a function of transmitting light, and is used for the purpose of, for example, calculating a place at which a radiation passes. As disclosed in Patent Literatures 1 to 3, in such a scintillating fiber, it is important that how ultraviolet light emitted from a core should be efficiently converted into light having a longer wavelength in order to transmit the light over a long distance.

Note that Patent Literature 1 discloses a method for efficiently transmitting light over a long distance by providing a reflective layer on the outside of a cladding layer.

Patent Literature 2 discloses a method for adding a fluorescent agent in a cladding layer in order to prevent a phenomenon called crosstalk in which light emitted from an adjacent fiber is detected.

Patent Literature 3 discloses a method for controlling the diameters of a core and a cladding layer in order to prevent the same radiation from being detected multiple times in a high-dose field.

Patent Literature 4 discloses a method for preventing the amount of emitted light from decreasing at the place where radiation travels across the fiber by controlling the concentration of a fluorescent agent in the core.

CITATION LIST

Patent Literature

Patent Literature 1: Japanese Unexamined Patent Application Publication No. S63-129304
Patent Literature 2: Japanese Unexamined Patent Application Publication No. 2000-137122
Patent Literature 3: International Patent Publication No. WO2018/043383
Patent Literature 4: International Patent Publication No. WO2018/110536

SUMMARY OF INVENTION

Technical Problem

The inventors of the present application have found the following problem with regard to the scintillating fiber.

In a conventional plastic scintillating fiber such as those disclosed in Patent Literatures 1 to 4, scintillation light generated by radiation that has reached the core is detected. However, some types of radiation, such as beta rays of tritium, have a significantly weakly penetrating property to a substance. In the case of such radiation having a weakly penetrating property, the radiation cannot reach the core of a conventional plastic scintillating fiber. Therefore, there has been a problem that no scintillation light is generated in the core, thus making it impossible to detect radiation.

An object of the present invention is to provide a plastic scintillating fiber capable of detecting radiation having a weakly penetrating property.

Solution to Problem

A plastic scintillating fiber according to an aspect of the present invention is a plastic scintillating fiber including a plastic optical fiber, further including:
 a core containing at least one type of a fluorescent agent;
 a cladding layer having a refractive index lower than that of the core disposed at a center; and
 an outermost layer covering an outer peripheral surface of the cladding layer, in which
 the outermost layer contains a base material that generates scintillation light, and at least one type of a fluorescent agent that converts the scintillation light into light having a wavelength longer than that of the scintillation light.

The fluorescent agent contained in the core may further convert the light generated in the outermost layer into light having a wavelength longer than the light generated in the outermost layer. Before radiation having a weakly penetrating property disappears, it is possible to convert the radiation into emission of light which has a longer wavelength and is less likely to be self-absorbed by the core base material.

The cladding layer may have a multi-cladding structure including an inner cladding layer, and an outer cladding layer covering an outer peripheral surface of the inner cladding layer and having a refractive index lower than that of the inner cladding layer.

The fluorescent agent contained in the core may convert ultraviolet light into blue light. Alternatively, the fluorescent agent contained in the core may convert blue light into green light. The blue light and the green light are light in a wavelength range to which a scintillation detector has high sensitivity.

Advantageous Effects of Invention

According to the present invention, it is possible to provide a plastic scintillating fiber capable of detecting radiation having a weakly penetrating property.

DESCRIPTION OF EMBODIMENTS

Figure 1:
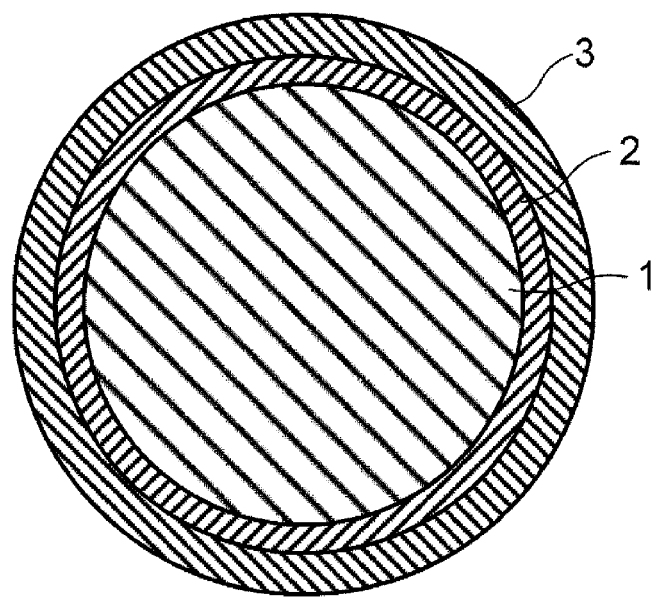
FIG. 1 is a cross-sectional view of a plastic scintillating fiber according to a first embodiment.

Embodiments according to the present invention will be described hereinafter with reference to the drawings. FIG. 1 is a cross-sectional view of a plastic scintillating fiber according to a first embodiment.

As shown in FIG. 1, the plastic scintillating fiber according to this embodiment is a plastic optical fiber including a core 1 disposed at the center thereof, a cladding layer 2 covering the outer peripheral surface of the core 1, and an outermost layer 3 covering the outer peripheral surface of the cladding layer 2.

Figure 2:
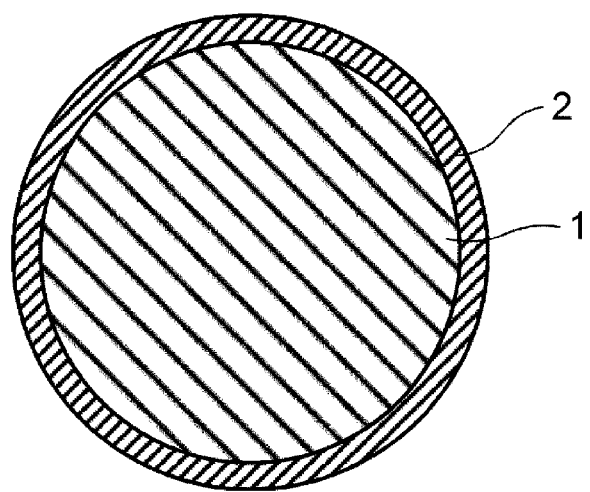
FIG. 2 is a cross-sectional view of a plastic scintillating fiber according to a comparative example.

Note that FIG. 2 is a cross-sectional view of a plastic scintillating fiber according to a comparative example, and corresponds to that shown in FIG. 1. As shown in FIG. 2, the plastic scintillating fiber according to the comparative example includes a core 1 disposed at the center thereof and a cladding layer 2 covering the outer peripheral surface of the core 1, but includes no outermost layer 3.

Each of the core 1 and the outermost layer 3 contains at least one type of a fluorescent agent for converting emission of light resulting from radiation into light having a wavelength longer than that of the original light. As the fluorescent agent, for example, a fluorescent agent for wavelength-converting ultraviolet light into blue light, or a fluorescent agent for wavelength-converting blue light into green light can be used.

The cladding layer 2 has a refractive index lower than that of the core 1. Note that the cladding layer 2 may have a multi-cladding structure including an inner cladding layer, and an outer cladding layer covering the outer peripheral surface of the inner cladding layer and having a refractive index lower than that of the inner cladding layer.

In the plastic scintillating fiber according to this embodiment, the outermost layer 3 contains a base material having a scintillating property for radiation, and a fluorescent agent for converting the scintillation light into light having a wavelength longer than that of the scintillation light. Therefore, it is possible to detect even radiation having a weakly penetrating property.

Its principle will be described hereinafter with reference to FIGS. 1 and 2.

Firstly, in the plastic scintillating fiber according to the comparative example shown in FIG. 2, radiation having a weakly penetrating property cannot reach the core 1. Therefore, since no scintillation light resulting from the radiation is generated, a detector cannot detect anything.

Next, in the plastic scintillating fiber according to this embodiment shown in FIG. 1, the base material of the outermost layer 3 of the fiber has an aromatic ring. Therefore, the base material absorbs the radiation and emits ultraviolet light having a longer wavelength. The emitted ultraviolet light is converted into light having a longer wavelength by the fluorescent agent contained in the outermost layer 3. In this manner, it is possible to convert radiation having a weakly penetrating property into light which has a longer wavelength and is less likely to be self-absorbed inside the fiber, and to make the light reach the core 1.

The light generated in the outermost layer 3 passes through the cladding layer 2 and reaches the core 1. The light that has reached the core 1 is converted into light having a longer wavelength by the fluorescent agent contained in the core 1. Part of the light is totally reflected at the interface between the core 1 and the cladding layer 2 because of the difference between their refractive indices, so that that part of the light is confined in the core 1 and propagates therethrough. The light that has propagated inside the core 1 is detected by a detector which is connected to one end or both ends of the fiber. Therefore, it is possible to detect even radiation having a weakly penetrating property by the detector.

[Raw Material]
<Core Base Material>

There are no restrictions on the raw material used for the core 1 of the plastic scintillating fiber as long as the raw material is transparent. Among them, a copolymer composed of any of methacrylate ester monomers typified by methyl methacrylate, acrylate ester monomers typified by methyl acrylate, and aromatic monomers having a vinyl group typified by styrene is suitable. Among them, a copolymer composed of an aromatic monomer having a vinyl group is preferred. There are no restrictions on the monomers used for the copolymerization as long as two or more types of monomer species are used.

<Cladding Base Material>

There are no restrictions on the raw material used for the cladding layer 2 of the plastic scintillating fiber as long as the raw material is transparent, and has a refractive index lower than that of the material of which the core is formed. Among them, a polymer or a copolymer composed of either of a combination of methacrylate ester monomers typified by methyl methacrylate and fluorinated monomers such as perfluoroalkyl methacrylate, and a combination of acrylate ester monomers typified by methyl acrylate and fluorinated monomers such as perfluoroalkyl acrylate is suitable.

<Outermost Layer Base Material>

There are no restrictions on the raw material used for the outermost layer 3 of the plastic scintillating fiber as long as the raw material is transparent, and absorbs radiation and emits ultraviolet light. Among them, a copolymer composed of any of methacrylate ester monomers typified by methyl methacrylate, acrylate ester monomers typified by methyl acrylate, and aromatic monomers having a vinyl group typified by styrene is suitable. Among them, a copolymer composed of an aromatic monomer having a vinyl group is preferred. There are no restrictions on the monomers used for the copolymerization as long as two or more types of monomer species are used.

Regarding these monomers, a polymer or a copolymer can be easily obtained by heat or light irradiation. Therefore, they are advantageous because it is possible to form a precise distribution of compositions, and they can be easily handled. In the polymerization, an organic peroxide or an azo compound may be added as a polymerization initiator. Typical examples of the organic peroxide include 1,1,3,3-tetramethylbutylperoxy-2-ethyl hexanoate, n-butyl-4,4-bis (t-butylperoxy)valerate, and 1,1-bis(t-butylperoxy)cyclohexane. However, there are no particular restrictions on the organic peroxide as long as it generates a radical by heat or light irradiation.

Further, mercaptan may be added as a chain transfer agent for adjusting the molecular weight. Typical examples of the mercaptan include octyl mercaptan, but there are no particular restrictions as long as it has a structure expressed as R—SH (where R represents an organic group).

<Fluorescent Agent>

The fluorescent agent is selected from those having a plurality of aromatic rings and a structure capable of resonating. Typical examples of the fluorescent agent include 2-(4-t-butylphenyl)-5-(4-biphenyl)-1,3,4-oxadiazole (b-PBD), 2-(4-biphenyl)-5-phenyl-1,3,4-oxadiazole (PBD), para-ter-phenyl (PTP), para-quarter-phenyl (PQP), 2,5-diphenyloxazole (PPO), 4,4'-bis-(2,5-dimethylstyryl)-diphenyl (BDB), 2,5-bis-(5-t-butyl-benzoxazoyl)thiophene (BBOT), 1,4-bis-(2-(5-phenyloxazolyl))benzene (POPOP), 1,4-bis-(4-methyl-5-phenyl-2-oxazolyl)benzene (DMPO-POP), 1,4-diphenyl-1,3-butadiene (DPB), 1,6-diphenyl-1,3, 5-hexatriene (DPH), 1-phenyl-3-(2,4,6-trimethylphenyl)-2-pyrazoline (PMP), and 3-hydroxyflavone (3HF). Only one of these fluorescent agents may be used, or a plurality of fluorescent agents may be used in a mixed manner. The fluorescent agent having a radiation light emitting property is preferably soluble in polymerizable monomers and polymers constituting the core and the outermost layer.

<First Fluorescent Agent>

One of the functions of the fluorescent agent is to absorb ultraviolet fluorescence emitted from the base material that has absorbed radiation, and convert the absorbed ultraviolet fluorescence into light having a longer wavelength and thereby emit the light having the longer wavelength. Therefore, the fluorescent agent contained in the outermost layer 3 is desirably one that absorbs light having a wavelength equal to or close to the light-emission wavelength of the base material of the outermost layer 3. Examples of such a fluorescent agent include, among the aforementioned fluorescent agents, b-PBD, PTP, and PQP. For the sake of convenience, such fluorescent agents are referred to as a first fluorescent agent(s). The first fluorescent agent preferably absorbs light having a wavelength of 250 to 350 nm, and preferably emits light having a wavelength of 300 to 400 nm.

<Second Fluorescent Agent>

In many cases, the light-emitting wavelength of the first fluorescent agent is lower than about 430 nm at which ordinary detectors have the optimum sensitivity for received light. Therefore, it is preferred to convert the light emitted by the first fluorescent agent into light having a longer wavelength. Accordingly, in some cases, a fluorescent agent for converting the light emitted by the first fluorescent agent into light having a longer wavelength is added. For the sake of convenience, such a fluorescent agent is referred to as a second fluorescent agent(s). For example, the first fluorescent agent is contained in the outermost layer 3, and the second fluorescent agent is contained in the core 1.

Examples of the second fluorescent agent include, among the aforementioned fluorescent agents, BBOT, BDB, and POPOP. The second fluorescent agent preferably absorbs light having a wavelength of 300 to 400 nm, and preferably emits light having a wavelength of 350 to 600 nm. Only one type of the second fluorescent agent may be used according to the wavelength of the light that is desired to be emitted, or a plurality of fluorescent agents may be used in a mixed manner. In the case where a plurality of fluorescent agents are used, the outermost layer 3 and the core 1 may contain fluorescent agents different from each other.

[Diameter of Fiber and Manufacturing Method]

The outer diameter of a plastic scintillating fiber according to the present invention is, for example, in a range of 0.1 to 3 mm. Regarding the ratio of thicknesses expressed as "Outermost Layer/Cladding Layer/Core/Cladding Layer/Outermost Layer" in the diameter direction is, for example, in a range from "1/1/96/1/1" to "10/10/60/10/10". As described above, the cladding layer may be a multi-cladding layer composed of a plurality of layers having refractive indices different from each other.

A plastic scintillating fiber according to the present invention can be manufactured, for example, based on a manufacturing method disclosed in Patent Literature 3.

The present invention is not limited to the above-described embodiments, and they may be modified as desired without departing from the scope and spirit of the present invention.

This application is based upon and claims the benefit of priority from Japanese patent application No. 2019-002289, filed on Jan. 10, 2019, the entire disclosure of which is incorporated herein in its entirety by reference.

REFERENCE SIGNS LIST

1 CORE
2 CLADDING LAYER
3 OUTERMOST LAYER

The invention claimed is:

1. A plastic scintillating fiber comprising a plastic optical fiber, further comprising:
   a core containing at least one type of a fluorescent agent;
   a cladding layer having a refractive index lower than that of the core disposed at a center; and
   an outermost layer covering an outer peripheral surface of the cladding layer, wherein
   the outermost layer contains a base material that generates scintillation light, and at least one type of a fluorescent agent that converts the scintillation light into light having a wavelength longer than that of the scintillation light, and
   the fluorescent agent contained in the core wavelength-converts ultraviolet light into blue light.

2. The plastic scintillating fiber according to claim 1, wherein the fluorescent agent contained in the core further convert the light generated in the outermost layer into light having a wavelength longer than that of the light generated in the outermost layer.

3. The plastic scintillating fiber according to claim 1, wherein
   the cladding layer has a multi-cladding structure comprising:
   an inner cladding layer; and
   an outer cladding layer covering an outer peripheral surface of the inner cladding layer and having a refractive index lower than that of the inner cladding layer.

4. A plastic scintillating fiber comprising a plastic optical fiber, further comprising:
   a core containing at least one type of a fluorescent agent;
   a cladding layer having a refractive index lower than that of the core disposed at a center; and
   an outermost layer covering an outer peripheral surface of the cladding layer, wherein
   the outermost layer contains a base material that generates scintillation light, and at least one type of a fluorescent agent that converts the scintillation light into light having a wavelength longer than that of the scintillation light, and the fluorescent agent contained in the core wavelength-converts blue light into green light.

5. The plastic scintillating fiber according to claim 4, wherein the fluorescent agent contained in the core further convert the light generated in the outermost layer into light having a wavelength longer than that of the light generated in the outermost layer.

6. The plastic scintillating fiber according to claim 4, wherein the cladding layer has a multi-cladding structure comprising:

an inner cladding layer; and an outer cladding layer covering an outer peripheral surface of the inner cladding layer and having a refractive index lower than that of the inner cladding layer.

* * * * *